July 24, 1951 D. F. WINNEK 2,562,078
APPARATUS FOR LENTICULATING FILM
Filed Aug. 29, 1947 3 Sheets-Sheet 1

INVENTOR.
Douglas F. Winnek
BY Robert S. Dunham
ATTORNEY

July 24, 1951 D. F. WINNEK 2,562,078
APPARATUS FOR LENTICULATING FILM
Filed Aug. 29, 1947 3 Sheets-Sheet 2

INVENTOR.
Douglas F. Winnek
BY
Robert S. Dunham
ATTORNEY

July 24, 1951  D. F. WINNEK  2,562,078
APPARATUS FOR LENTICULATING FILM
Filed Aug. 29, 1947  3 Sheets-Sheet 3
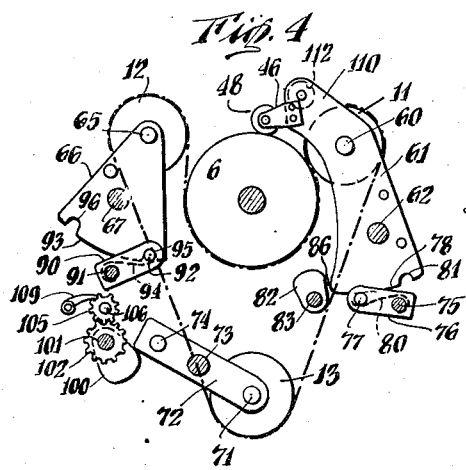
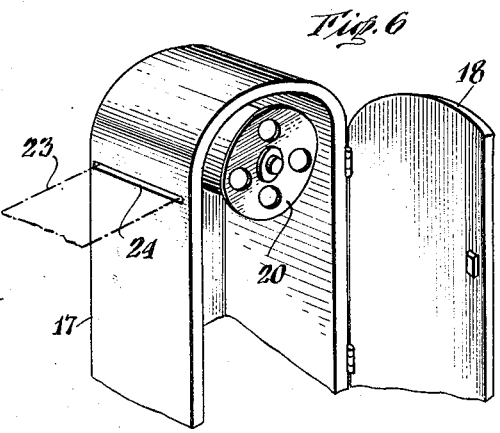
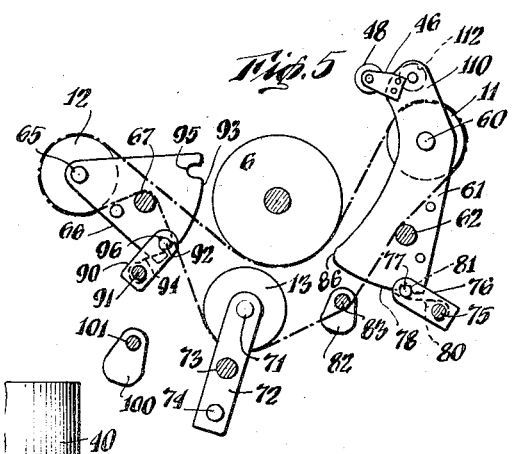
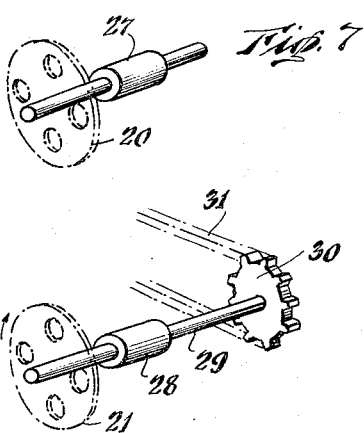
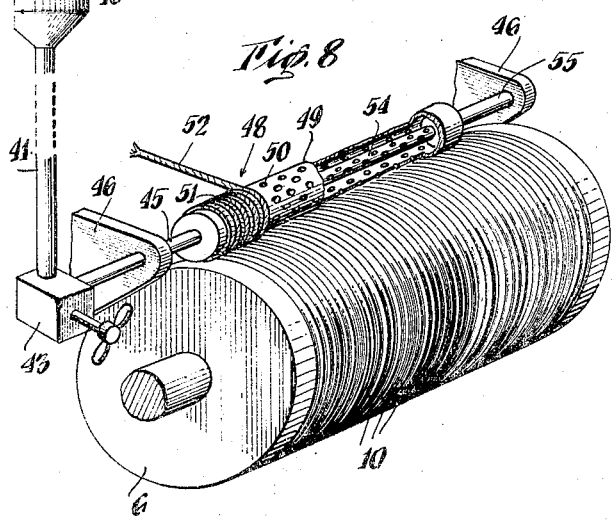
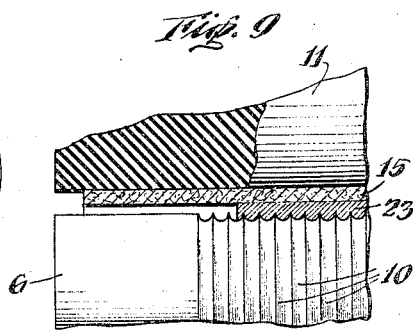
INVENTOR.
Douglas F. Winnek
BY
Robert S. Dunham
ATTORNEY Patented July 24, 1951

2,562,078

UNITED STATES PATENT OFFICE 2,562,078

APPARATUS FOR LENTICULATING FILM

Douglas F. Winnek, Atlantic City, N. J.

Application August 29, 1947, Serial No. 771,220

8 Claims. (Cl. 18—10)

This invention relates to apparatus for lenticulating transparent sheet material, for example cellulose acetate or other material such as is used for photographic film, as well as other plastic sheet material. More specifically, the invention is directed to improvements in apparatus for carrying out procedure such as described and claimed in my Patent No. 2,296,804, granted September 22, 1942, for Embossing Sheets of Cellulose Acetate and the Like. An important example of an article made by the present apparatus is lenticular film to be used for stereo-photography, or transparent screens for taking, printing or viewing composite stereographs, which are pictures divided into minute image components each of which is subdivided into aspect elements such that when viewed through a lenticular resolving screen or the like, a multiplicity of different aspects of the entire picture are respectively seen at a corresponding multiplicity of localities. As a result, stereoscopic effects are obtained, preferably such as to be observed within a considerable lateral range of distance at the viewing position.

A preferred type of lenticular film or screen comprises a sheet of transparent material embossed with a multiplicity of minute, parallel, contiguous ridges, each having a surface consisting of a section of a cylinder or other surface of optically effective shape, designed to focus incident, parallel rays of light in a corresponding line behind the lenticulated surface, e. g., in a plane at or behind the opposite surface of the film. In the same manner, such a screen, e. g. when used over the printed image of a composite stereograph for viewing the latter, focuses rays of light from the several, linear aspect elements behind each ridge or other lenticulation, into beams divergent from the face of the screen in different directions, each directed beam thus representing only a single aspect element. For best results the lenticulations should be very fine; for instance, there should ordinarily be at least about 200 ridges per inch, and preferably 300 or more. Each such ridge, moreover, must be true, straight and as nearly optically perfect as possible, throughout its length from top to bottom of the picture, for greatest sharpness and clarity of definition and for optimum stereoscopic or other relief characteristics with respect to the accompanying picture.

For photographic purposes, film having a desired base thickness and having a coating of sensitive emulsion on one side exposable by light through the opposite side is converted to use in making negative or positive stereographs, by embossing its uncoated (opposite) side with lenticulations of the kind described. Manifestly the lenticulating operation should avoid damage to the emulsion side of the sheet, and should ordinarily avoid any impairment of the photographic properties of the emulsion.

For further explanation of the character and requirements of lenticular film or screens, reference may be made to my Patent No. 2,296,804 mentioned above, and particularly to my presently copending application Serial No. 771,219, filed August 29, 1947, for Composite Stereography.

In my cited Patent No. 2,296,804, a continuous sheet of film or the like is passed, under pressure, around an embossing roller, while at the same time a suitable solvent is used, e. g. such as acetone or other material appropriate to soften the cellulose acetate or other substance of which the film is made. This is a peculiarly effective type of operation and accordingly the apparatus herein shown and described as an example of the present invention embodies the use of a solvent to soften the film.

Important objects of the invention are to provide improved, more accurate and more efficient apparatus of the character described; to provide lenticulating apparatus specially designed to handle film carrying a sensitive emulsion (although capable of handling uncoated sheet material), e. g. a continuous strip of film; to provide such apparatus which is effective to emboss short pieces of film as well as long ones; to provide apparatus which can be loaded, adjusted and controlled with great facility; to provide novel and improved arrangements for spreading and applying solvent—it being extremely desirable that the solvent reach the entire surface of the film or the embossing cylinder with great uniformity and in carefully regulated amount; and to afford improved film supplying and advancing means and other improved features and combinations in such machines.

To these and other ends, including such as are hereinafter apparent or otherwise incidental to the use and practice of the present improvements, one advantageous embodiment of the invention is disclosed by way of example in the accompanying drawings and in the following description, which will serve to demonstrate the various novel features and combinations, as well as their underlying principles.

Referring to the drawings:

Figs. 4 and 5 are diagrammatic elevations of a part of the machine shown in Fig. 3, but showing also certain supporting structures and illustrating the belt guiding rollers in respectively operative and open positions;

Fig. 6 is a fragmentary perspective view of the film reel housing;

Fig. 7 is a perspective diagram of the film reel drive;

Fig. 8 is a perspective view, with certain portions broken away, of the solvent-applying mechanism of the lenticulating machine; and Fig. 9 is an enlarged fragmentary view on line 9—9 of Fig. 3.

Figure 1:
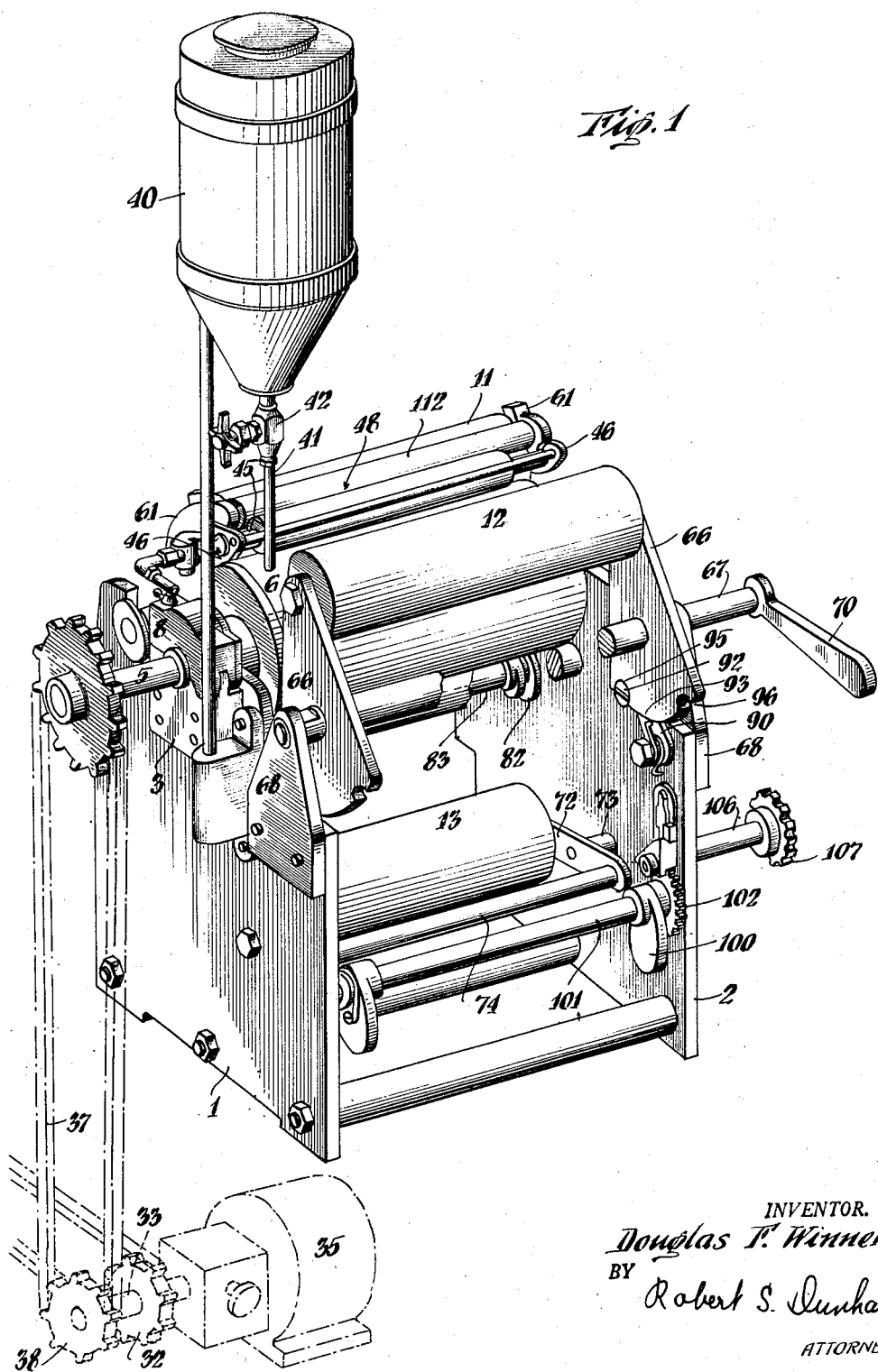
Figs. 1 and 2 are perspective views taken from respectively opposite sides of a film-lenticulating machine in accordance with the invention, certain parts being broken away in one or another of these figures.

Reference may first be particularly made to Figs. 1, 2, 3, 6 and 8, which show the general organization of the apparatus as well as some of its primary features. The illustrated machine comprises spaced upright supporting plates 1, 2, carrying bearings 3, 4 for the shaft 5 of an embossing roller 6, which is thus mounted for rotation about a horizontal axis, the bearings 3, 4 having upper parts 8 hinged so that they may swing open to permit removal of the roller 6 with its shaft, e. g. for replacement by another roller when desired. The cylindrical surface of the roller 6 is machined to constitute a matrix or die, with a multiplicity of contiguous, annular grooves 10 adapted to emboss the desired lenticulations upon the surface of a film pressed against the cylinder. Cooperating with the embossing roller 6 are a pressure roller 11 and guide or idler rollers 12, 13, rotatable on horizontal shafts and operatively mounted in the relation indicated by Fig. 3, the counter roller 11 substantially abutting one upper side of the roller 6, with the roller 12 spaced somewhat from the other upper side of the roller 6 and the roller 13 disposed substantially beneath the latter.

Figure 3:
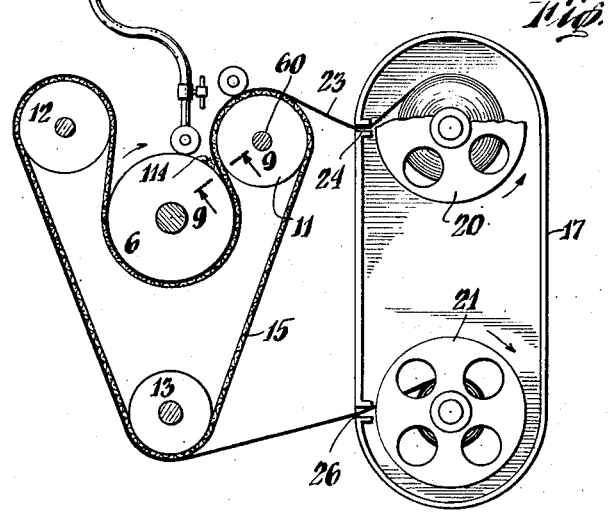
Fig. 3 is a diagrammatic elevation of the lenticulating machine.

An endless web or strip of suitably flexible and preferably absorbent material such as finely woven duck, canvas or the like 15 (wide webbing of nylon being especially suitable, and also being unaffected by acetone) extends around the guide rollers 12, 13 and the pressure roll 11, and thence in a reverse direction around the embossing roller 6 back to the guide roller 12, all as indicated in Fig. 3. Adjacent the machine a reel box 17 having a light-tight door 18 (Fig. 6) supports, on horizontal axes, a supply reel 20 and a receiving reel 21 for film to be lenticulated by the embossing roller 6. The continuous film strip 23 is thus unwound from the upper reel 20, leaving the box through a slot 24 which is lined with felt or other light-blocking material. The film strip passes around the counter roller 11, on the surface of the belt 15, and thence continues around the surface of the embossing cylinder 6 beneath the belt. The film is further carried on the outer surface of the belt around the rollers 12 and 13, whence it passes through a similar light-tight slot 26 to be rewound on the receiving reel 21.

In accordance with the usual practice for film supplying or rewinding mechanisms, appropriate slipping, retarding or yieldable or other compensating means may be provided to the extent necessary in the shafts for the reels, e. g. as schematically indicated at 27, 28 in Fig. 7. The shaft 29 of the receiving reel is positively driven by a pulley 30 and belt 31 extending to a corresponding pulley 32 on the shaft 33 of a variable speed motor drive unit designated 35 (Fig. 1). The embossing roll 6 may also be positively driven from the motor 35 by means of a sprocket 36 turned by a chain 37 passing around a sprocket 38 on the motor drive shaft 33. Thus the embossing roll is positively actuated and likewise the shaft 29 of the film winding reel, the latter including suitable means as explained above to compensate for the necessary decrease in angular velocity of the roll of film as it builds up with a constant circumferential film speed governed by the positive drive of the cylinder 6.

A supply of solvent such as acetone is contained in a tank 40 from which it flows by gravity through a pipe 41 having appropriate valve means as indicated at 42 in Fig. 1 and 43 in Fig. 8. The pipe 41 communicates with the interior of a hollow shaft 45 journalled at its ends in appropriate supports 46 and carrying a tubular spreader assembly generally designated 48, the disposition of the supports 46 (as hereinbelow explained) being such that the spreader assembly may be positioned in direct rolling contact with surface of the embossing cylinder 6.

While other solvent distributing or spreading arrangements may be employed, the illustrated structure (Fig. 8) comprises a cylindrical shell 49 having a multiplicity of perforations 50 throughout its surface, which is completely covered on its exterior with a winding of permeable fabric, e. g. a winding 51 of nylon cord or thread 52. Centrally spaced within the shell 49, the hollow shaft 45 is likewise pierced with a multiplicity of openings 54 throughout its extent, the remote end 55 of the shaft being closed against escape of liquid. It will now be seen that as liquid flows down from the tank by gravity it is rapidly and effectively distributed first along the interior of the shell 49, particularly along the lowermost inner surface thereof, and then passes through the apertures 50 and effectively wets the cord winding 51. The latter, which is in contact with the surface of the embossing cylinder 6, transfers a distributed film of the solvent to the surface of the cylinder, in a peculiarly effective manner to insure that the entire surface of the cylinder is wet by the liquid. Indeed it has been found that the minute annular or helical ribs of the cord winding 51 cooperate effectively with the annular grooves of the embossing roller in the spreading operation.

For ready insertion of a film strip and also for cleaning or removal of the embossing roll 6, the several rollers 11, 12 and 13 are movably mounted and means are also provided for adjustably positioning the roller 13 to maintain a desired tension on the carrier web 15. Referring specifically to Figs. 1, 2, 4 and 5 the shaft 60 of the roller 11 is journaled at its ends in a pair of arms 61 which are mounted on a shaft 62. The shaft 62 is journaled in the side plates 1, 2 and has a projecting portion carrying a handle 64, the arrangement being such that upon turning the handle the arms 61 are rocked to swing the roller 11 toward and away from the embossing roller 6. The roller 12 has a shaft 65 similarly journaled at its ends in a pair of triangular plates 66 which are in turn mounted on a shaft 67. The shaft 67 is journaled in appropriate supports 68 secured to the side plates 1, 2 and likewise has an extension carrying a handle 70 by which the plates may be rocked to move the roller 12 between the positions of Figs. 4 and 5.

Figure 2:
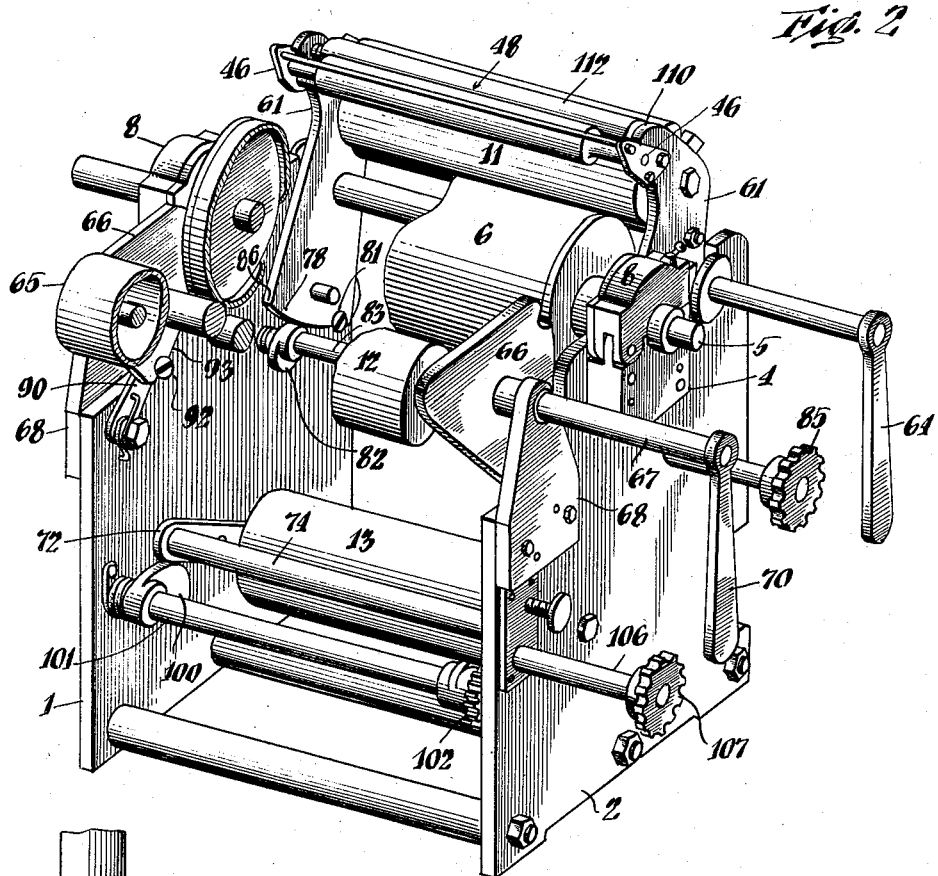

The shaft 71 of the bottom roller 13 is journaled in a pair of rocker arms 72 which are pivoted at their mid-points upon stub shafts 73 projecting inwardly from the side members 1, 2. The rocker arms are tied together, so as to constitute a rigid frame for rotative support of the roller 13, by a rod 74 at the other end of the arms. As indicated in Figs. 1 and 2, the arms and plates just described and shown diagrammatically in Figs. 4 and 5 are essentially duplicated on both sides of the rollers, but for convenience reference will be made simply to the parts at one side, as shown in the last mentioned figures.

Means are provided for releasably holding the several rollers in desired positions. For example a shaft 75 carries a short arm 76 from which a stud 77 projects, below the curved lower edge 78 of the arm 61, i. e. on the other side of the shaft 62 from the roller shaft 60. The arm 76 is urged clockwise by a spring 80 (Fig. 4) so that the stud 77 presses against the edge 78 and when the arm 61 is rocked clockwise to the position of Fig. 5, the stud moves into a notch 81 in the edge 78, thus releasably holding the roller 11 in open position. A cam 82 carried on a shaft 83 which is journaled in the side members and has an operating knob 85 (Fig. 2) is arranged to abut a lower corner or side 86 of the arm 61, the shape of the cam being such that when the arm 61 is in the position of Fig. 4 the knob 85 can be turned clockwise (and held in adjusted position, if desired, by suitable releasable ratchet means, not shown) whereby the cam tends to force the arm 61 in a counterclockwise direction, providing a desired pressure between the counter roller 11 and the embossing roller 6.

For the plate 66 a similar locking arm 90 is provided, mounted on a shaft 91 and carrying a stud 92. The arm is spring-urged toward the curved lower surface 93 of the member 66 by a spring 94, so that the stud may be selectively engaged in one or the other of a pair of recesses 95, 96 spaced along the edge 93. Thus when the arm 66 and roller 12 are in the position of Fig. 4 the stud 92 is seated in the recess 95. Upon rotating the shaft 67 by turning the handle 70 counterclockwise, the stud is first forced out of the recess 95 and then, after traveling along the edge 93, is reseated in the notch 96, holding the parts in the position of Fig. 5, but releasable for their return displacement upon moving the handle 70 in the opposite direction.

For adjusting the tension on the web 15 by means of the roller 13, a cam 100 is provided, mounted on a shaft 101 and disposed to engage an outer corner or edge of the rocker arm 72, e. g. adjacent and beneath the rod 74. The shaft 101 carries a gear 102 meshing with another gear 105 on an operating shaft 106 which carries a knob 107 (Fig. 2) outside of the plate 2. The gear 106 is also provided with releasable ratchet means 109 to hold the train in a desired position. It will thus be seen that upon turning the knob clockwise, the cam 100 is urged counterclockwise, thus tending to rock the arm 72 clockwise about its pivot 73 and to pull the roller 13 down to tension the web 15. The parts are then held in tensioned position by the ratchet arrangement 109. To release the cam 100 the ratchet is released and the knob 107 turned in the reverse direction, or simply allowed to turn by counter pressure of the rocker arm 72. In either event, when the upper rollers 11, 12 are separated and thereby raise the lower part of the web 15, the arm 72 is free to swing counterclockwise, permitting the roller 13 to occupy an upper position as shown in Fig. 5.

The arms 61 also carry upward extensions generally designated 110 on which are mounted the bearing supports 46 for the solvent distributing roller 48. The extensions 110 may also support a retaining roller 112 which can be somewhat spaced from the surface of the roller 11 but will facilitate the initial operation of threading the film through the machine. When the arms 61 are rocked to separate the roller 11 from the embossing roller, the distributing roller 48 is similarly separated, it being understood that the conduit 41 (Fig. 3) may be made of flexible material to accommodate such displacement of the distributing roller.

It will now be seen that if the several parts are disposed in the open relationship of Fig. 5, a film may be easily threaded through the machine on the web or belt 15, the film passing outside the rollers 11, 12 and 13 but under the roller 6, i. e. between it and the belt. So threaded from a supply reel 20, the other end of the film may be secured to the take-up reel 21 and the door 18 of the reel box closed. Thereupon the handles 64 and 70 are rocked respectively in counterclockwise and clockwise directions, to bring the rollers 11, 12 into the position of Fig. 4. The stud 77 having snapped out of the notch 81 at the outset of such displacement, and the arm 61 having been moved to the position of Fig. 4, the knob 85 is then turned clockwise to tighten the roller 11 against the embossing roller 6, by means of the cam 82. Upon rocking the shaft 67, the stud 92 has snapped out of the notch 96 and is reengaged in the notch 95, the arm 66 and roller 12 being then releasably held in the position of Fig. 4 with the roller close to but spaced from the embossing roller.

At the same time the roller 13, being relatively heavy, drops down by gravity to its lower position so that the cam 100 can be turned up against the edge of the rocker arm, by appropriate operation of the knob 107. Tension is thus applied to the belt 15 to the desired extent, and the machine is ready for operation. Upon opening the valves 42 and 43 to the required extent, solvent flows through the distributor roll 48 and down over the surface of the embossing roller 6, forming a very slight pool between the roller and the approaching film 23, as shown in exaggerated fashion at 114 in Fig. 3. Thereupon the motor 35 is started and the embossing roller 6 and take-up reel 21 are set in operation.

As the film passes between the rollers 6 and 11 and then on around the roller 6, its surface is promptly softened by the solvent, and the pattern of the embossing roller, namely the design of the desired lenticular ridges, is accurately embossed in the surface of the film, running continuously lengthwise of the latter. By the time the film separates from the roller 6, having been in contact with the latter for at least about one-half of its circumference, and preferably more as shown, the rigid configuration is fully set. Further setting and drying may occur if necessary during the subsequent passage of the film around the rollers 12 and 13 so that upon its rewind on the reel 21 the desired lenticulations are rigidly and permanently embodied in the film surface. It will be understood that during the actual running of the machine, it should be kept in a darkened region, or at least there should be no light of such character as might partially expose or fog the sensitized emulsion of the film.

It will also be understood that the emulsion or sensitive surface is disposed against the web 15 and thus away from the roller 6, throughout the course of the film in the apparatus.

Upon completion of a run, and in preparation for a further run, the knobs 85 and 107 are loosened, the latter by release of the ratchet mechanism, and the handles 64 and 70 are swung in an opposite direction to open the rollers 11 and 12 away from the embossing roller, i. e. restoring the parts to the position of Fig. 5.

The described machine affords a desirably continuous operation for figuring film or other flexible, transparent sheet material in the manner described. It is capable of handling film of various widths and the several adjustments necessary to threading the machine and maintaining proper pressure and tension are easily accomplished. At the same time, the desired result of embossing is achieved with remarkable uniformity and accuracy and the film as rewound is thus immediately ready to be used, e. g. when cut in sheets of appropriate length, in a camera of the sort described hereinabove or in other equipment for taking or reproducing relief pictures. The web 15 not only provides a support and cushion for the film, particularly around the cylinder or roller 6 and at the pressure region between the rollers 11 and 6, but also absorbs any excess solvent that might overflow the edges of the film, which preferably has a shorter transverse dimension than the web. As a matter of fact, however, the illustrated spreading arrangement provides an effective distribution of the solvent with such careful regulation that there is little if any overflow during actual operation, or at least not appreciably more than is advantageous to insure softening of the film as explained in my Patent No. 2,296,804.

It is to be understood that the invention is not limited to the specific apparatus herein shown and described but may be embodied in other forms without departure from its spirit as defined by the following claims.

I claim:

1. In lenticulating apparatus, in combination, an embossing roller having a multiplicity of closely adjacent minute, lenticular shaped depressions distributed continuously over the surface of said roller, film handling means including means for maintaining film under pressure against the surface of said embossing roller and for removing film therefrom, and means for supplying solvent liquid to the surface of said embossing roller, said means comprising a hollow roller disposed adjacent the surface of said embossing roller and having a multiplicity of perforations for distribution of liquid in said hollow roller axially along the surface of the embossing roller, and means for supplying solvent material to the interior of said hollow roller, said liquid supplying means being adapted to effect distribution of liquid throughout the embossing roller surface, and said film pressure maintaining means including means pressing the film against the roller for softening the film by the solvent liquid and for embossing the film in conformity with the lenticular shaped depressions.

2. The apparatus of claim 1, wherein the hollow roller comprises a perforated cylinder having an outer covering of pervious, fibrous material, said outer covering being disposed in contact with the embossing roller.

3. The apparatus of claim 1, wherein the hollow roller comprises a hollow cylinder having a multiplicity of perforations, a concentric tube of substantially smaller diameter than said cylinder disposed therein, said tube being connected at one end to said solvent supply means and at the other end having a plurality of perforations for distribution of liquid into the cylinder, said cylinder having an outer wrapping of continuous fibrous cord constituting a cylindrical outer surface of pervious character, and said cylinder being disposed parallel to the axis of the embossing roller and in contact therewith at a region circumferentially spaced from a region of contact of the film with the cylinder.

4. In apparatus for lenticulating film, in combination, an embossing roller, a counter roller mounted for movement into and away from a position wherein said counter roller urges a film under pressure against the embossing roller, pivoted means for rocking said counter roller into and out of said position, and cooperating cam means adapted to engage said pivoted means for urging the counter roller toward the embossing roller.

5. In apparatus for lenticulating film, in combination, an embossing roller, a cooperating counter roller adapted to urge film under pressure against the embossing roller, mounting means for said counter roller, said mounting means being pivotally mounted to rock about an axis spaced from the axis of the roller and being thereby movable to shift the counter roller into and away from a position of pressure engagement with the film and embossing roller, and releasable locking means for holding the counter roller away from said position.

6. In apparatus for lenticulating film, in combination, an embossing roller, a cooperating counter roller adapted to urge film under pressure against the embossing roller, mounting means for said counter roller movable to shift the counter roller into and away from a position of pressure engagement with the film and embossing roller, releasable locking means for holding the counter roller away from said position, rotatable cam means adapted to engage said mounting means upon movement of same into position for pressing a film against the embossing roller and means for turning said cam means to exert pressure on the mounting means, for thereby causing the counter roller to exert said pressure.

7. In apparatus for lenticulating film, in combination, an embossing roller, a plurality of cooperating rollers carrying a continuous film-supporting belt, said cooperating rollers including a pair of rollers disposed in proximity to said embossing roller for passage of said continuous belt around a substantial portion of the surface of said embossing roller, means mounting said pair of rollers for movement into and away from their aforesaid positions of proximity and means for shifting said mounting means to move the rollers, said pair of rollers being disposed, in their said positions of proximity, to hold the belt normally in contact with the said portion of the embossing roller surface, and said pair of rollers being adapted, on movement away from said positions, to displace the belt away from the embossing roller at substantial parts of the aforesaid portion of its surface, to afford access to said embossing roller, the aforesaid cooperating rollers including a fourth roller engaging the belt and having movable mounting means and tensioning means for urging said movable mounting means in a direction to tension the belt, said tensioning means being releasable so that said fourth roller may move to relieve tension on the belt when the pair of rollers are displaced away from the embossing roller, the aforesaid pair of rollers, in their aforesaid belt-displacing movement, being adapted to pull the belt against said fourth roller, said fourth roller and its movable mounting means being biased to move in a direction toward the belt, and being shiftable in an opposite direction, when the tensioning means is released, upon pressure by the belt against the fourth roller, and said movable mounting means being thereby adapted to move automatically, upon release and in response to displacement of the belt by displacement of the pair of rollers, to effect said tension-relieving movement of the fourth roller.

8. In apparatus for lenticulating film, in combination, an embossing roller, a plurality of cooperating rollers carrying a continuous film-supporting belt, said cooperating rollers including a pair of rollers disposed in proximity to said embossing roller for passage of said continuous belt around a substantial portion of the surface of said embossing roller, means mounting said pair of rollers for movement into and away from their aforesaid positions of proximity, said mounting means comprising a mounting device for each roller, adapted to rock about an axis spaced from the axis of the roller so that the roller may swing laterally of the embossing roller toward and away from the aforesaid positions, and means for rocking the mounting devices to move the rollers, said pair of rollers being disposed, in their said positions of proximity, to hold the belt normally in contact with the said portion of the embossing roller surface, and said pair of rollers being adapted, on movement away from said positions, to displace the belt away from the embossing roller at substantial parts of the aforesaid portion of its surface, to afford access to said embossing roller.

DOUGLAS F. WINNEK.

REFERENCES CITED

The following references are of record in the file of this patent:

UNITED STATES PATENTS

| Number | Name | Date |
|---|---|---|
| 988,981 | Danzer | Apr. 11, 1911 |
| 1,327,091 | Egerton | Jan. 6, 1920 |
| 1,612,714 | Geyer | Dec. 28, 1926 |
| 2,077,508 | Bierer | Apr. 20, 1937 |
| 2,143,627 | Knowland | Jan. 10, 1939 |
| 2,182,168 | Bierer | Dec. 5, 1939 |
| 2,296,372 | Smith et al. | Sept. 22, 1942 |
| 2,358,176 | MacDonald | Sept. 12, 1944 |